US010333831B2

(12) United States Patent
Boucadair et al.

(10) Patent No.: US 10,333,831 B2
(45) Date of Patent: Jun. 25, 2019

(54) METHOD OF OPTIMIZING THE LOAD OF A NETWORK CONNECTION CONCENTRATOR

(71) Applicant: Orange, Paris (FR)

(72) Inventors: Mohamed Boucadair, Betton (FR); Christian Jacquenet, Pont-Pean (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 15/741,107

(22) PCT Filed: Jun. 29, 2016

(86) PCT No.: PCT/FR2016/051614
§ 371 (c)(1),
(2) Date: Dec. 29, 2017

(87) PCT Pub. No.: WO2017/001776
PCT Pub. Date: Jan. 5, 2017

(65) Prior Publication Data
US 2018/0351852 A1    Dec. 6, 2018

(30) Foreign Application Priority Data

Jul. 1, 2015  (FR) ..................................... 15 56204

(51) Int. Cl.
*H04L 12/707*    (2013.01)
*H04L 12/709*    (2013.01)
(Continued)

(52) U.S. Cl.
CPC .............. *H04L 45/24* (2013.01); *H04L 45/12* (2013.01); *H04L 45/245* (2013.01);
(Continued)

(58) Field of Classification Search
CPC ...... H04L 45/24; H04L 45/12; H04L 61/2007
(Continued)

(56) References Cited

U.S. PATENT DOCUMENTS 8,943,201 B2 * 1/2015 Larson ................ H04L 63/0876
709/225
10,097,465 B2 * 10/2018 Sreeramoju ........... H04L 47/125
(Continued)

FOREIGN PATENT DOCUMENTS

EP    2882148 A1    6/2015
WO   2015055945 A1   4/2015

OTHER PUBLICATIONS

International Search Report dated Oct. 3, 2016 for corresponding International Application No. PCT/FR2016/051614, filed Jun. 29, 2016.
(Continued)

*Primary Examiner* — Stephen J Clawson
(74) *Attorney, Agent, or Firm* — David D. Brush; Westman, Champlin & Koehler, P.A.

(57) ABSTRACT

An method for optimizing load of a network connection concentrator in which data packets transmitted or received by a client-device compatible with a multipath connection protocol are intercepted by a concentrator reachable from a network to which the client-device is connected. The concentrator aggregates connections using a plurality of paths that may be used by the client-device. The method includes: a) the client-device sends a message for setting up a connection with a third party; b) the connection setup message is intercepted by the concentrator; c) the concentrator sends a connection setup message to the third party in which the source address is identical to one of the addresses of the concentrator; d) the concentrator sends information to the third party including another address; and e) the concentrator notifies the third party to switch the session associated with the source address so as to associate it with the other address.

15 Claims, 9 Drawing Sheets

(51) Int. Cl.
*H04L 29/08* (2006.01)
*H04L 29/06* (2006.01)
*H04L 12/721* (2013.01)
*H04L 29/12* (2006.01)

(52) U.S. Cl.
CPC ........ *H04L 61/2007* (2013.01); *H04L 67/148* (2013.01); *H04L 69/14* (2013.01); *Y02D 50/30* (2018.01)

(58) Field of Classification Search
USPC ........................................................ 370/393
See application file for complete search history.

(56) References Cited

U.S. PATENT DOCUMENTS

| | | | | | |
|---|---|---|---|---|---|
| 2004/0107261 | A1* | 6/2004 | Donzis | ................... | H04L 29/06 709/207 |
| 2011/0258431 | A1* | 10/2011 | Gundavelli | ....... | H04L 29/12254 713/150 |
| 2012/0044908 | A1* | 2/2012 | Spinelli | ................. | H04W 92/02 370/331 |
| 2012/0099601 | A1* | 4/2012 | Haddad | ............. | H04L 29/12405 370/401 |
| 2012/0144062 | A1* | 6/2012 | Livet | ....................... | H04L 45/24 709/239 |
| 2013/0194963 | A1* | 8/2013 | Hampel | .................. | H04L 45/24 370/254 |
| 2013/0318239 | A1* | 11/2013 | Scharf | .................... | H04L 69/16 709/224 |
| 2014/0153489 | A1* | 6/2014 | Perras | ................... | H04W 60/00 370/328 |
| 2014/0153583 | A1* | 6/2014 | Gouache | ................ | H04L 45/24 370/437 |
| 2015/0109999 | A1* | 4/2015 | Godin | .................. | H04W 92/20 370/328 |
| 2015/0312383 | A1* | 10/2015 | Roeland | ................. | H04L 69/18 370/331 |
| 2016/0094467 | A1* | 3/2016 | Hong | .................. | H04L 47/2441 370/235 |
| 2016/0248859 | A1 | 8/2016 | Jacquenet et al. | | |
| 2017/0163522 | A1* | 6/2017 | Sreeramoju | ............. | H04L 45/24 |

OTHER PUBLICATIONS

Written Opinion of the International Searching Authority dated Oct. 3, 2016 for corresponding International Application No. PCT/FR2016/051614, filed Jun. 29, 2016.
English translation of the Written Opinion of the International Searching Authority dated Oct. 3, 2016 for corresponding International Application No. PCT/FR2016/051614, filed Jun. 29, 2016.
G. Hampel et al. "MPTCP Proxies and Anchors draft-hampel-mptcp-proxies-anchors-00." Multipath TCP, Internet-Draft, Intended Status: Standards Track. Feb. 8, 2012.
Information Sciences Institute, University of Southern California. "Internet Protocol: DARPA Internet Program Protocol Specification." RFC: 791. Sep. 1981.
J. Postel. "Internet Control Message Protocol: DARPA Internet Program Protocol Specification." RFC 792. Sep. 1981.
Information Sciences Institute, University of Southern California. "Transmission Control Protocol: DARPA Internet Program Protocol Specification." RFC 793. Sep. 1981.
H-W. Braun. "Models of Policy Based Routing." RFC 1104. Jun. 1989.
J. Moy. "OSPF Version 2." RFC 2328. Apr. 1998.
C. Demichelis et al. "IP Packet Delay Variation Metric for IP Performance Metrics (IPPM)." RFC 3393. Nov. 2002.
L. Berger et al. "The OSPF Opaque LSA Option." RFC 5250. Jul. 2008.
R. Coltun et al. "OSPF for IPv6." RFC 5340. Jul. 2008.
A. Ford et al. "TCP Extensions for Multipath Operation with Multiple Addresses." RFC 6824. Jan. 2013.
M. Scharf et al. "Multipath TCP (MPTCP) Application Interface Considerations." RFC 6897. Mar. 2013.

* cited by examiner

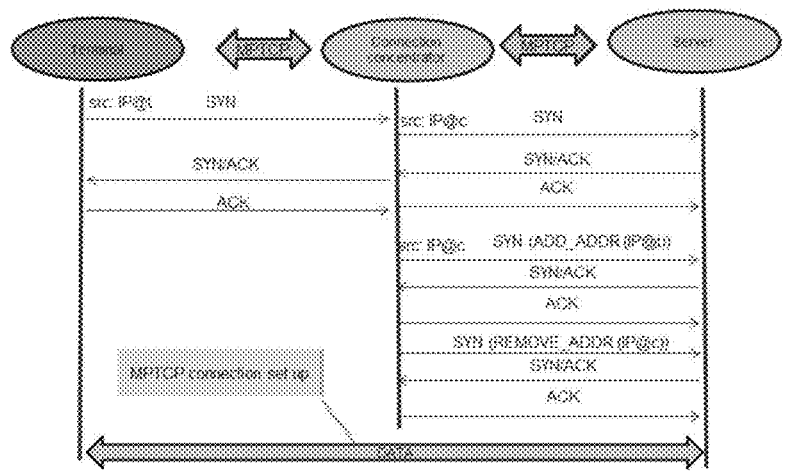
FIG. 6
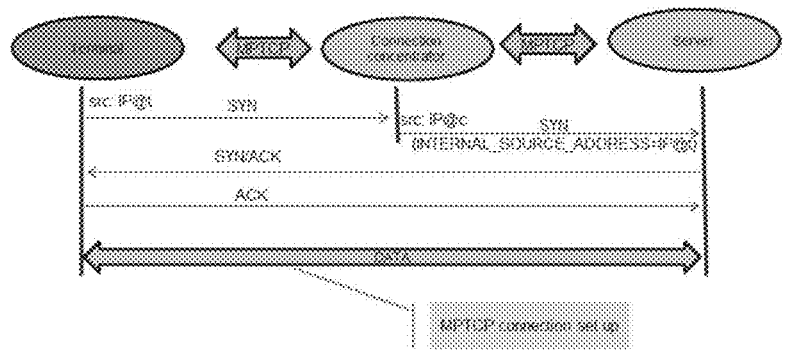
FIG. 7
FIG. 8

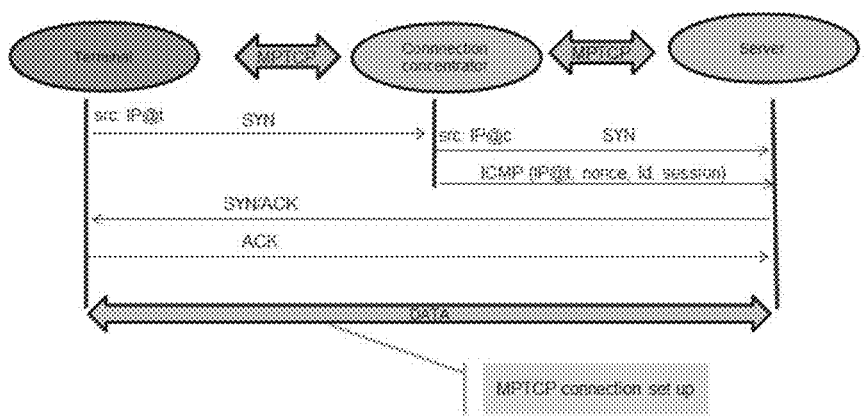
FIG. 9
```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|              Age              |     Options     |      10     |
+-+-+-+-+-+-+-+-+-+-+-+-+-+-+-+-+-+-+-+-+-+-+-+-+-+-+-+-+-+-+-+-+
|           Identifier          |            Instance           |
+-+-+-+-+-+-+-+-+-+-+-+-+-+-+-+-+-+-+-+-+-+-+-+-+-+-+-+-+-+-+-+-+
|                       Advertising Router                      |
+-+-+-+-+-+-+-+-+-+-+-+-+-+-+-+-+-+-+-+-+-+-+-+-+-+-+-+-+-+-+-+-+
|                       Sequence Number                         |
+-+-+-+-+-+-+-+-+-+-+-+-+-+-+-+-+-+-+-+-+-+-+-+-+-+-+-+-+-+-+-+-+
|           Checksum            |            Length             |
+-+-+-+-+-+-+-+-+-+-+-+-+-+-+-+-+-+-+-+-+-+-+-+-+-+-+-+-+-+-+-+-+
```
FIG. 10
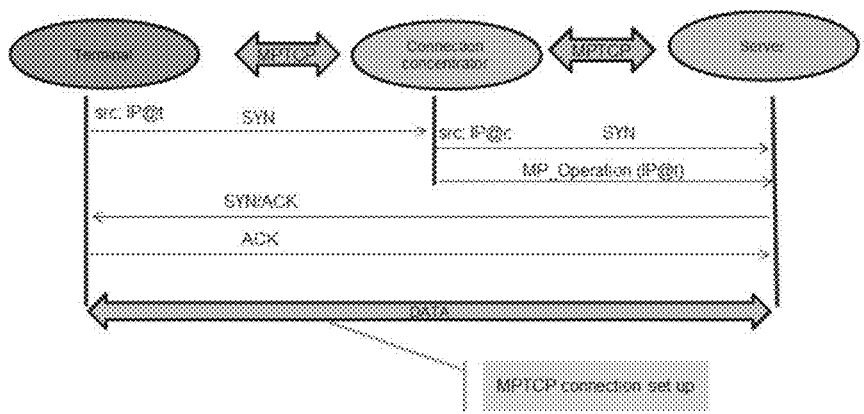
FIG. 11

METHOD OF OPTIMIZING THE LOAD OF A NETWORK CONNECTION CONCENTRATOR

CROSS-REFERENCE TO RELATED APPLICATIONS

This Application is a Section 371 National Stage Application of International Application No. PCT/FR2016/051614, filed Jun. 29, 2016, the content of which is incorporated herein by reference in its entirety, and published as WO 2017/001776 on Jan. 5, 2017, not in English.

FIELD OF THE DISCLOSURE

The present invention relates to the field of telecommunications, and in particular to communications networks suitable for implementing the Internet protocol (IP). More particularly, the present invention relates to providing "added-value" services in IP networks, i.e. networks capable of performing processing that differs depending on the nature of the data traffic being conveyed in the network.

The invention applies to any type of client-device, such as a fixed or mobile terminal, or a residential gateway, or a business gateway, or a network operator gateway, or indeed a set-top box (STB). For reasons of concision, a client-device of any type is often referred to below as a "terminal".

BACKGROUND OF THE DISCLOSURE

Terminals, such as smartphones or personal computers (PCs) are nowadays capable of activating and using a plurality of logic interfaces associated with one or more physical interfaces. Such terminals are said to be multi-interface (MIF) terminals. When a terminal has a plurality of interfaces capable of connecting it to different access networks (e.g.: fixed, mobile, or WLAN), it benefits from access that is said to be "hybrid", because it combines different access network technologies.

A plurality of IP addresses can be allocated to such MIF terminals so that they can connect to different types of network such as a fixed network, a mobile network, or a wireless local area network (WLAN), where the emblematic example would be a WiFi network, and in a manner that may be simultaneous or deferred. These IP addresses may:
  belong to the same family of addresses or to different families of addresses (IPv4, IPv6, or both);
  have different lifetimes;
  have different scopes, e.g. a private IPv4 address, a unique IPv6 address of local scope (i.e. a unique local address (ULA)), or an IPv6 address of global scope (global unicast address (GUA)); and
  be allocated to the same logical network interface or to different logical network interfaces.

Nevertheless, it should be observed that the "MIF" characteristic is volatile, since the ability to use a plurality of interfaces depends on conditions of connection to the network(s), on the location of the device, or on other factors. An MIF device may in particular make use of a plurality of interfaces that are available to it while setting up a simple connection (i.e. a connection set up along a single path with a given third party), or after setting up a simple connection. It may also be observed that a device does not know a priori whether it has the possibility of using a plurality of distinct paths for setting up a connection with a given third party. More precisely, the device acquires this information (where appropriate) only at the end of a stage during which it attempts to set up a multipath connection with the third party.

It should be recalled that a "multipath connection" is a connection set up between two devices and simultaneously following one or more paths between those two devices. Such a connection complies with a dedicated protocol, such as multipath TCP (MPTCP) which may optionally be defined as an extension of a previously defined transport protocol, such as transmission control protocol (TCP). In other words, a multipath connection is an aggregate of one or more simple connections following the same path or different paths (which may be partially or completely disjoint).

It should also be recalled that in the field of networks, the term "link aggregation" designates grouping together a plurality of links that are associated with a corresponding number of "logical" interfaces as though they were a single link associated with a single interface, in particular for the purpose of increasing data rates beyond the limits of a single link, but also for applying the same operating procedures to all of the links aggregated in this way (a concept referred to as "fate sharing"). In particular, service offers relating to a terminal having hybrid access rely on introducing functions into the network in order to make it possible to aggregate all of the network connections of a terminal (e.g.: WLAN and 3G, or: ADSL, WLAN, and 4G).

Link aggregation may optionally also ensure that other interfaces take over if a network link should fail (redundancy principle). Link aggregation applies to any type of traffic conveyed over such links, including IP traffic.

Link aggregation could also be used for sharing traffic over a plurality of links. Under such circumstances, the sharing of traffic among the links that make up an aggregate depends on various parameters; the sharing of traffic may depend for example on the type of traffic, such as transmission control protocol (TCP) or user datagram protocol (UDP), or on the traffic engineering policy, such as the required quality of service (QoS).

By way of example, FIG. 1a shows a terminal T connected to a server S via a plurality of IP networks referenced R1, . . . , Rm, and O, by implementing the multipath TCP (MPTCP) connection protocol. The various access networks R1, . . . , Rm may be of wired, wireless, or other natures; furthermore, these accesses may be multiple, i.e. the terminal T may have the capacity to connect to different access networks optionally in simultaneous manner.

Likewise, FIG. 1b shows a terminal T compatible with MPTCP or only with TCP, and located behind a piece of equipment referred to as a proxy-device R; the proxy-device R is itself connected to a server S via a plurality of IP networks written R1, . . . , Rm, and O, implementing the multipath TCP connection protocol (MPTCP).

In general manner, the term "proxy-device" is used to designate a piece of equipment located in the network and acting on behalf of one or more client-devices, such as a terminal or a gateway. This configuration enables the client-device to benefit from optimized use of available network resources, and also to set up multipath connections quickly.

It should be observed that link aggregation makes no assumptions about the configuration of the remote machine. Thus, a source machine may activate a link aggregation function without the remote machine using such a function.

Various modes of aggregation may be envisaged, including the following three modes:
  backup mode: this mode consists in using secondary paths in the event of primary paths being unavailable, with this being for the purpose of improving the availability of the network and thus the robustness and the reliability of IP connections set up over the various links;

bonding mode: this mode consists in using the resources associated with some or all of the available paths, the IP streams associated with a given application possibly being shared among a plurality of paths; the decision to use all of the paths, or only some of them, may for example be conditioned by the nature of the traffic or the availability or reliability characteristics associated with each path, which characteristics may vary greatly from one path to another; all of the paths selected for this bonding mode are considered as being primary paths; and a "comfort" mode: this mode is similar to the bonding mode, except that the streams of a given application are not shared among a plurality of paths, but are sent over a single path.

It should be observed that these modes are not mutually exclusive, and that they are not specific to any one particular type of traffic. Thus, they may be put into place independently of the nature of the traffic that is to be conveyed along paths aggregated in one or another of the various modes.

Nevertheless, using multiple paths for setting up communications raises problems of various kinds.

It is commonly accepted that the use of load sharing mechanisms between a plurality of paths needs to ensure that those paths possess a comparable level of quality of transfer, in particular so as to avoid weakening the integrity of the data that is characteristic of a given connection and that is exchanged over those various paths (the quality of transfer may be characterized by a plurality of parameters including, in particular: latency, jitter, and/or rate of packet loss).

When a terminal benefits from hybrid access, its actual ability to make use of all of its interfaces is generally associated with the quality of each of the access networks in question, as perceived by the terminal, or by an application that is active in the terminal. This quality may be expressed in terms of available bandwidth, or of time to access a desired resource, or indeed in terms of variation in transmission delay, as specified in Document RFC 3393 of the Internet engineering task force (IETF). This quality naturally varies from one access network to another, and may present considerable disparities that could compromise setting up a multipath communication over the various access networks; the risk of a loss of integrity of the streams exchanged during the communication increases with any increase in such differences, to such an extent that the communication might become unintelligible. Furthermore, this disparity varies over time, e.g. as a function of the level of utilization of the resources of a network. The quality of the aggregated link also depends on the locations and the effectiveness of the network functions that enable of the network connections of a terminal to be aggregated.

These different quality levels can compromise setting up additional subflows in the context of a multipath connection. The magnitude of the above-mentioned risk of loss of integrity might incite the terminal to set up a simple connection only, even though that means losing the benefits of a multipath connection, such as optimizing available bandwidth resources or preserving continuity of a connection in the event of loss of attachment to a first network and re-attachment to a second network.

Such a risk is also made worse in the context of a terminal that does not have its own means enabling it to set up a multipath connection, and doing this by involving a proxy-device such as the device described briefly above. In this context, the question of disparity between the quality levels associated with using a plurality of available proxy-functions (e.g. depending on the location of the remote terminal with which the terminal seeks to set up a communication) becomes correspondingly more complex to solve when the terminal does not necessarily have the information and the intelligence required for selecting the proxy-device that presents the best guarantees of quality, e.g. depending on the nature of the traffic, of the application, or of the service associated with the communication.

Furthermore, at present, multipath protocols have not yet been adopted in generalized manner by content servers. Thus, some content servers process multiple connections as disjoint connections, and do not have a mechanism enabling them to correlate a plurality of connections in order to associate them with a single terminal, which has the unfortunate consequence of preventing any attempt at setting up a multipath connection, as shown in FIG. 2a.

As shown in FIG. 2b, this problem of a server being incompatible with multipath connections has an impact on the effectiveness of the communications of any terminal seeking to communicate with such a server, whether the terminal is connected directly to the network or via a proxy-device.

In order to assist terminals, residential gateways (e.g. home or business gateways), set-top boxes, or other client-devices in setting up and maintaining connections via multiple paths, IP connectivity suppliers make use of devices referred to as "network connection concentrators". A "network connection concentrator" designates any network function making it possible to aggregate connections making use of different paths that might be used by a device in order to set up a communication with a remote device.

By way of example, a network connection concentrator (the term "concentrator" on its own is used below for reasons of concision) may be a function in a residential gateway, it may cohabit with an MPTCP or with a stream control transmission protocol (SCTP) proxy-function, or with a generic routing encapsulating (GRE) tunnel termination point, or indeed it may be a termination point of IP-in-IP tunnels or of level 2 tunnels. Where appropriate, the aggregation of all the multiple paths by a concentrator may give rise to one or more virtual tunnels being set up, e.g. in order to facilitate management operations associated with setting up the communication (by isolating the traffic exchanged over the various paths that have been aggregated in this way, and by improving the process for detecting failures).

As examples, FIGS. 3a, 3b, and 3c show various types of architecture associated with network connection concentrators.

These figures show a terminal T connected to one or more IP networks R1, ..., Rm, or O via N nodes ($P_1$, $P_2$, ..., $P_N$) having a network connection concentrator function. By way of example, such a node may be a gateway (home or business) or an IP router. In the figures, it can be seen that:

the terminal may be connected to a single network O managed by a single IP connectivity supplier that has deployed at least one network connection concentrator (FIG. 3a); or the terminal may be connected to m networks R1, ..., Rm, all hosting at least one network connection concentrator (FIG. 3b); or indeed the terminal may be connected to m networks R1, ..., Rm, some of which host a plurality of network connection concentrators (FIG. 3c).

Advantageously, intervention by a network connection concentrator has the particular effect that a connection that is seen by a local device as being a multipath connection may be seen by a remote device as being a plurality of simple connections, as shown in FIG. 4.

However an IP connectivity supplier can equally well decide to use a network connection concentrator on the path(s) over which a communication is set up, even if the remote device is compatible with multipath connections (e.g. MPTCP). Specifically, using a concentrator serves advantageously to monitor continuously the quality of the aggregated connection, e.g. as a result of activating so-called "TCP connection acceleration" mechanisms. Furthermore, the presence of the concentrator facilitates activating the filters required for legal interception needs, since all of the traffic passes through the concentrator.

In order to optimize the resources supplied by concentrators, network operators seek to manage load sharing among concentrators deployed in their networks in order to set up and maintain multipath connections. For example, an operator may desire:

- to withdraw a concentrator from a certain connection between two endpoints, but without thereby withdrawing the concentrator from one more connections having other endpoints, with this being for the purpose of reducing the load on the concentrator; or
- to withdraw a concentrator from all of the connections with which it is involved, with this being for the purpose of facilitating maintenance operations on the concentrator (e.g. planned major software updating operations).

The operator then needs to deal with several technical problems. In order to fix ideas, assume that one of the endpoints is a terminal of a subscriber to the network, while the other is a content server that can be reached via the network. The operator then needs in particular to deal with the following difficulties:

- if the terminal is compatible with multipath connections but the server is not, withdrawing the concentrator from the connection will have the result that the operator will no longer be able to offer the same level of quality to the subscriber as is provided by using a concentrator, possibly to such an extent as to lose the benefit of having a multipath connection set up by means of the concentrator (e.g. improving access time to content); and
- even if the terminal and the server are both compatible with multipath connections, withdrawing (possibly prematurely) the concentrator (which is in series between the endpoints) will lead to a break in the connection, which break is not desired by the terminal or by the server.

SUMMARY

The present invention thus relates to an optimization method for optimizing the load of a network connection concentrator in which data packets transmitted or received by a client-device compatible with a given multipath connection protocol are intercepted by a concentrator that is reachable from at least one network to which said client-device is connected, said concentrator serving to aggregate connections making use of a plurality of paths that may be used by the client-device. Said method is remarkable in that it comprises the following steps:

a) the client-device sending a message for setting up a connection with a third party;

b) said connection setup message being intercepted by the concentrator;

c) the concentrator sending a connection setup message to said third party in which the source address, referred to as the "first" address, is identical to one of the addresses of the concentrator;

d) the concentrator sending information to the third party including another address, referred to as the "second" address; and e) the concentrator notifying the third party that it is to switch the session associated with said first address so as to associate it with said second address.

Specifically, the inventors of the present invention have realized that as a result of the client-device and the concentrator being compatible with multipath connections, it is possible to avoid interrupting an ongoing communication between the client-device and the third party. The integrity of the communication is not at risk since the third party migrates locally the characteristic states of the ongoing session so as to associate them with a new address (said second address) that is communicated to the third party. Unlike the nominal behavior of a TCP terminal, in which any modification to at least one IP address or to the port number will penalize the operation of an ongoing TCP connection, and potentially suddenly break it, the method of the invention guarantees session continuity by making provision to send a message to the third party instructing it to correlate the address initially used for setting up the connection with the new address. The third party in this example processes these two addresses as being addresses that are equivalent from the point of view of managing connections. As a result, the third party can update its connection tables so as to replace the initial address (optionally together with the port number) with the new address (optionally together with the new port number) without there being any need to send any other control message for this purpose.

By means of these provisions, implementation of the invention is completely transparent for the client-device.

It should be observed that as illustrated in the implementations described below, this session switching notification may be implicit or explicit.

It should also be observed that the optimization method of the invention applies to any type of IP traffic. In particular, the method may advantageously be implemented for exchanging data transported using any of the following protocols: TCP, UDP, SCTP, IP-in-IP, TCP-over-UDP, or TCP-over-TCP. By way of example, setting up GRE or IP-in-IP tunnels makes it possible to aggregate some or all of the IP traffic (including in particular TCP and UDP traffic) between a terminal and one or more concentrators.

It should also be observed that said client-device may be any device compatible with the IP protocol. The client-device may be of any type, e.g. a terminal, a router, a residential gateway, or a set-top box, and it may be an MIF device or a single-interface device. It may have one or more IP addresses allocated to each of its physical or logical interfaces. It may also have only one interface, in which case it is assumed that it is situated behind a proxy-device (such as a router or a residential gateway) connected to one or more networks and compatible with a link aggregation mechanism. Furthermore, the client-device may be configured to abstain from using a network link aggregation mechanism for certain networks, or under certain operating conditions (e.g. when network connection concentrators are overloaded).

Furthermore, in the particular circumstance that said multipath protocol is the MPTCP protocol, the invention makes it possible to improve significantly the engineering and the operation of such multiple connections (as described below) by improving the quality and the robustness of the process of managing subflows that is characteristic of the MPTCP protocol. For example, putting tunnels into place as mentioned above may advantageously be combined with MPTCP functions for engineering reasons, such as off-loading MPTCP proxies if the remote server is compatible with the MPTCP protocol; a network operator can thus optimize the network resources that are dedicated to the MPTCP proxy-function.

According to certain particular characteristics, said second address is identical to one of the addresses of said client-device, or to one of the addresses of a backup concentrator.

Thus, e.g. in order to perform planned maintenance operations on a concentrator or because of a concentrator being overloaded, an operator can choose between:
  withdrawing the concentrator from paths used by some or all of the traffic; and/or
  switching some or all of the traffic from this concentrator, referred to as the "initial" concentrator, to one or more other concentrators, referred to as "backup" concentrators.

If the client-device is in communication with a third party that is not compatible with multipath connections, the operator will withdraw the initial concentrator only after replacing it with at least one backup concentrator. In contrast, if the third party is also compatible with multipath connections, the operator can act for some or all of the traffic either to replace the initial concentrator with at least one backup concentrator, or else purely and simply to withdraw the concentrator (with the result for the traffic in question of losing the benefit of the above-mentioned quality control mechanisms, but at least preserving the multipath connection).

Because of these provisions, after performing the steps of the invention, the client-device and the third party communicate for all or part of the traffic without passing via the initial concentrator (naturally unless a contra-decision is taken subsequently).

According to other particular characteristics, said third party is likewise compatible with said multipath protocol, and:
  in said step d), said concentrator mentions said second address in a first option inserted in a session control message; and
  in said step e), the concentrator mentions said first address in a second option inserted in a session control message.

According to yet other particular characteristics, in said steps d) and e), said concentrator inserts an option in a session control message sent to said third party, which option provides the third party with said second address and implicitly notifies the third party that it is to switch the session associated with said first address so as to associate it with said second address.

According to yet another particular characteristics, in said steps d) and e), said concentrator sends a notification message to said third party providing the third party with said second address and notifying the third party implicitly that it is to switch the session associated with said first address so as to associate it with said second address.

According to yet other particular characteristics:
  said third party has the capacity to process characteristic information for implementing the open shortest path first (OSPF) protocol; and
  the equipment hosting the concentrator function is connected to or is itself an OSPF router;
  and in said steps d) and e), said concentrator sends a packet of opaque link state advertisement (LSA) type to said third party, providing the third party with said second address and notifying the third party implicitly that it is to switch the session associated with said first address so as to associate it with said second address.

In a second aspect, the invention relates to a network connection concentrator reachable from at least one network to which a client-device compatible with a given multipath connection protocol is connected, the concentrator having means for intercepting data packets sent or received by said client-device and for aggregating connections making use of a plurality of paths that can be used by the client-device. Said concentrator is remarkable in that it further comprises means for:
  intercepting a message sent by said client-device for setting up a connection with a third party;
  sending a connection setup message to said third party in which the source address, referred to as the "first" address, is identical to one of the addresses of the concentrator;
  sending information to the third party including another address, referred to as the "second" address; and
  notifying the third party that it is to switch the session associated with said first address so as to associate it with said second address.

According to particular characteristics, said second address is identical to one of the addresses of said client-device, or to one of the addresses of a backup concentrator.

According to other particular characteristics, said third party is likewise compatible with said multipath protocol, and said concentrator further comprises means for:
  mentioning said second address in a first option inserted in a session control message; and
  mentioning said first address in a second option inserted in a session control message.

According to yet other particular characteristics, said concentrator further comprises means for inserting an option in a session control message sent to said third party, which option provides the third party with said second address and implicitly notifies the third party that it is to switch the session associated with said first address so as to associate it with said second address.

According to yet other particular characteristics, said further comprises means for sending a notification message to said third party providing the third party with said second address and notifying the third party implicitly that it is to switch the session associated with said first address so as to associate it with said second address.

According to yet other particular characteristics, while said third party has the capacity to process characteristic information for implementing the open shortest path first (OSPF) protocol, the equipment hosting the concentrator function is connected to or is itself an OSPF router, and in that it further comprises means for sending a packet of opaque link state advertisement (LSA) type to said third party, providing the third party with said second address and notifying the third party implicitly that it is to switch the session associated with said first address so as to associate it with said second address.

The advantages made available by these concentrators are essentially the same as those made available by the optimization methods set out briefly above.

It should be observed that it is possible to implement these concentrators in the context of software instructions and/or in the context of electronic circuits.

The invention also provides a computer program downloadable from a communications network and/or stored on a computer-readable medium and/or executable by a microprocessor. The computer program is remarkable in that it includes instructions for executing steps of any one of the optimization methods set out briefly above, when executed on a computer.

The advantages made available by the computer program are essentially the same as those made available by the optimization methods set out briefly above.

BRIEF DESCRIPTION OF THE DRAWINGS

Other aspects and advantages of the present invention appear on reading the following detailed description of particular embodiments given as non-limiting examples. The description refers to the accompanying figures, in which:

FIG. 2a, mentioned above, shows the failure of an attempted MPTCP connection in the configuration of FIG. 1a;

FIG. 6 shows a first implementation of the invention;

FIGS. 7 and 8 show a second implementation of the invention;

FIG. 9 shows a third implementation of the invention;

FIGS. 10 and 11 show a fourth implementation of the invention;

DETAILED DESCRIPTION OF ILLUSTRATIVE EMBODIMENTS

Figure 1A:
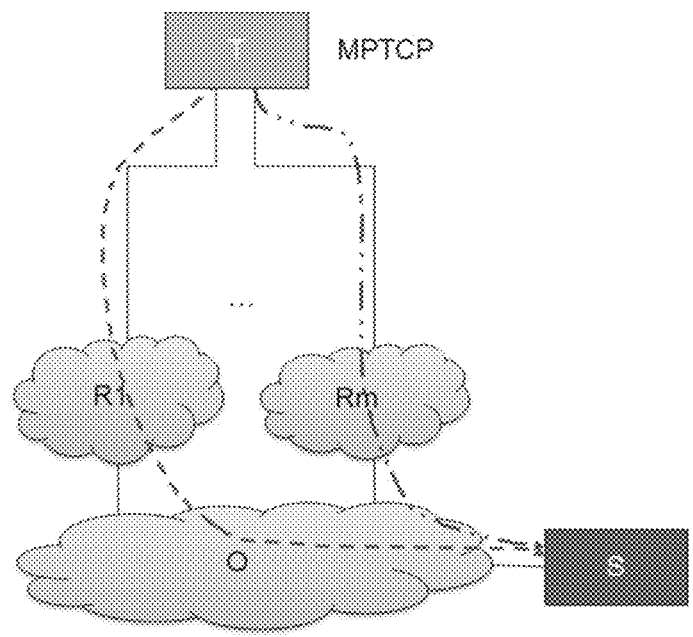
FIG. 1a, mentioned above, shows a terminal T that is compatible with MPTCP and connected to a server S via a plurality of IP networks.
Figure 1B:
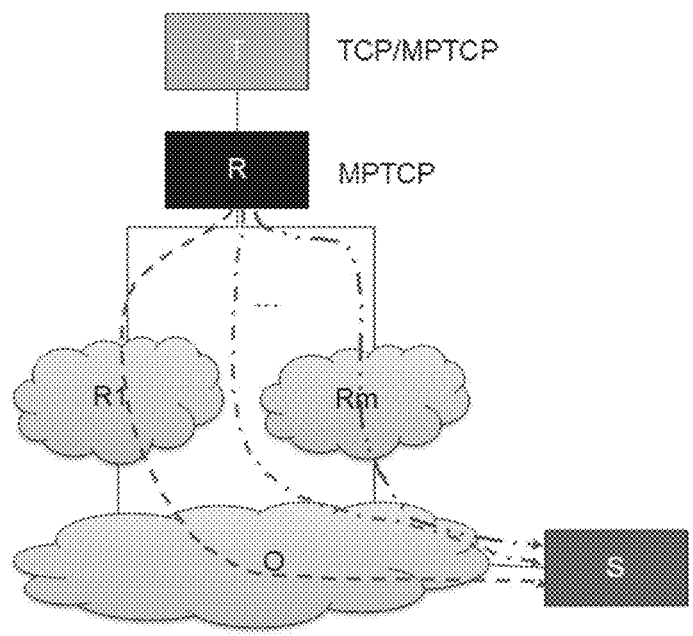
FIG. 1b, mentioned above, shows a terminal T that is compatible with TCP or MPTCP, and that is placed behind a proxy-device R compatible with MPTCP and connected to a server S via a plurality of IP networks.
Figure 2A:
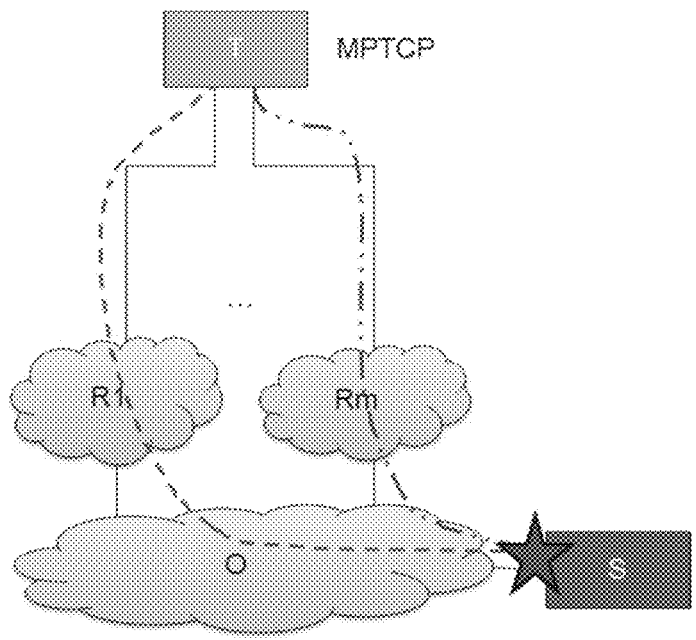
Figure 2B:
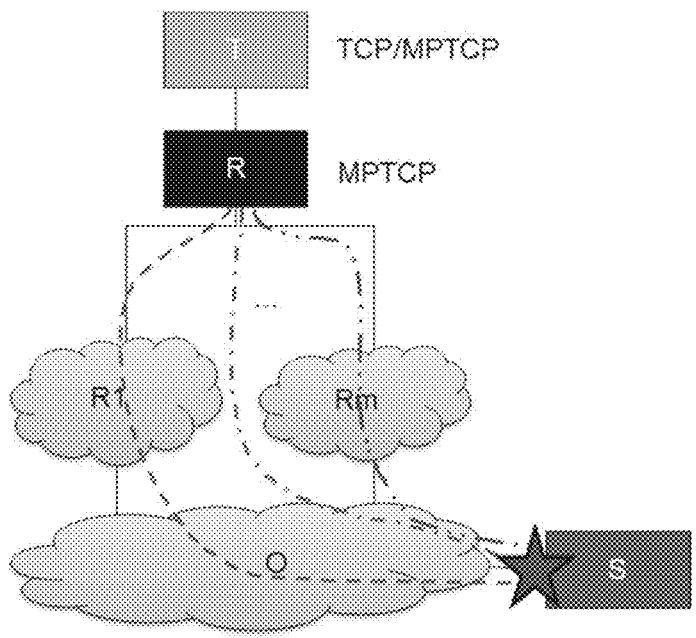
FIG. 2b, mentioned above, shows the failure of an attempted MPTCP connection in the configuration of FIG. 1b.
Figure 3A:
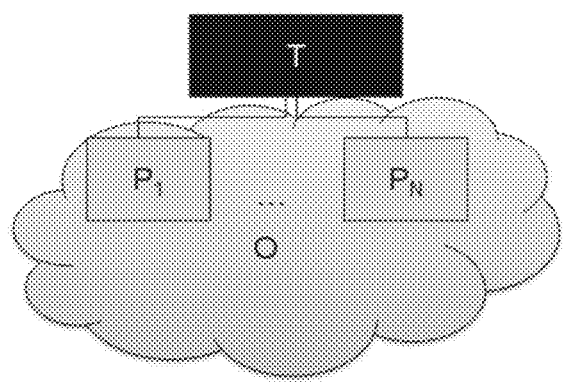
FIGS. 3a, 3b, and 3c, mentioned above, show various types of architecture associated with network connection concentrators.
Figure 3B:
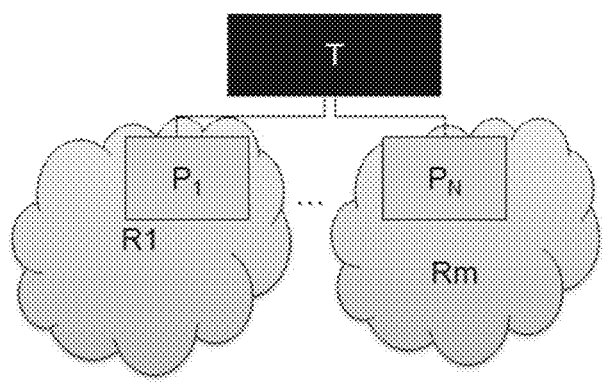
Figure 3C:
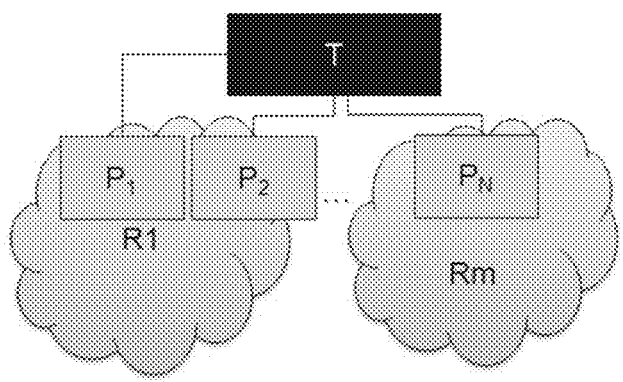
Figure 4:
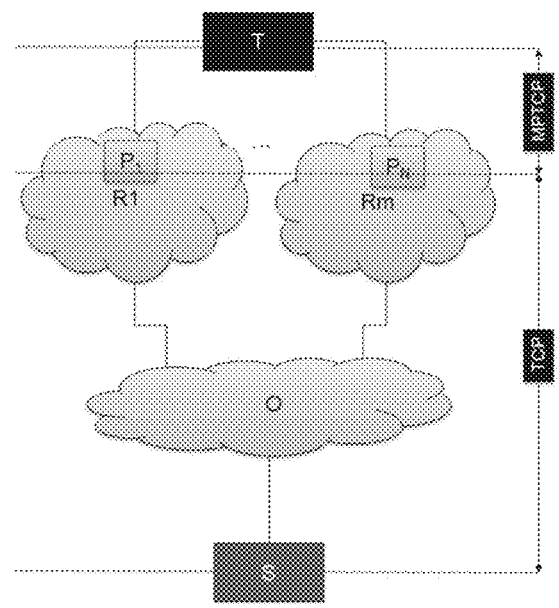
FIG. 4, mentioned above, shows a terminal T compatible with MPTCP and connected to a server S compatible with TCP via N network connection concentrators ($P_1, P_2, \ldots, P_N$) situated in m access networks R1, ..., Rm.

The implementations of the invention described below propose using TCP or IP options (where IP options are optional field described in IETF Document RFC 791, that can be included in an IPv4 packet) for communications of various kinds, including those that do not rely on a particular transport protocol, or those that rely on the UDP protocol. In a variant, use may be made of such or such an encapsulation scheme, however such schemes are relatively complex to implement.

It should be recalled that the TCP protocol (as defined in particular in Document RFC 793) is one of the main protocols used by terminals connected to an IP network (e.g. the Internet), such that the literature often refers to the "TCP/IP" suite of protocols. The TCP protocol serves to convey a stream of digital data in reliable, ordered, and error-free manner between applications executed on terminals connected to a local network (e.g. an Intranet) or to the Internet. The TCP protocol operates at the level of the transport layer of the OSI model. Web browsers use the TCP protocol when they connect to remote servers; the TCP protocol is also used for conveying email or for transferring files from one place to another. Protocols such as HTTP, HTTPS, SMTP, POP3, IMAP, SSH, FTP, Telnet, and various other protocols are transported over TCP connections. A TCP connection is identified by the address and the port number of the source terminal, and also by the address and the port number of the destination terminal.

Two terminals may insert "TCP options" in the TCP messages exchanged between them, e.g. for the purpose of optimizing the quality of the TCP connection. Such options occupy the space available at the end of the TCP header, and are of a length that is expressed in octets (8-bit bytes). The kind of the option is a unique identifier describing the nature of the TCP option. For example, the value "0" indicates the end of the list of options, and the value "2" indicates the maximum size of the TCP segment (i.e. maximum segment size (MSS)).

It should be observed that other means for encoding the information contained in the TCP options that are defined below could be considered, as a function of the mode of communication activated between the concentrators. The term "option" is also used by way of example to designate an IPv6 extension header, an IPv4 option, or the "source address-source port number" field(s) of an encapsulated packet, the "destination address-destination port number" field(s) of an encapsulated packet, one or more fields of an encapsulated packet, one or more fields of a packet encapsulating an original packet, or an extension to an encapsulation scheme, and also an option of the TCP protocol or of some other transport protocol, or indeed a combination of these various means.

The arrival of MIF terminals makes it possible to use the resources of a plurality of paths via the available networks in order to set up a TCP connection, making use of some or all of the IP addresses allocated to the various interfaces of MIF terminals. Nevertheless, this possibility introduces complexity that is characteristic of the mode of operation of the TCP protocol: given that any TCP connection is associated with an IP address and a port number, any change to at least one of those items of information is of a nature to penalize the operation of the current TCP connection, and thus the service making use of said TCP connection. Such a change is particularly prejudicial when the terminal is given a new IP address, or when the terminal connects to another network, or indeed when the interface with which the IP address is associated is no longer available. For example, means for informing a remote TCP third party that an IP address is no longer valid are then needed in order to ensure that an existing connection is maintained without interrupting the services made available by that TCP connection.

In 2009, the "mptcp" workgroup of the IETF was tasked with specifying extensions to the TCP protocol capable of accommodating the constraints imposed by the possibility of allocating a plurality of IP addresses to the various logical or physical interfaces of a terminal. That workgroup published initial specifications for the MPTCP protocol (cf. A. Ford, C. Raiciu, and M. Handley "TCP extensions for multipath operation with multiple addresses", RFC 6824, January 2013)—that certain smartphones and certain operating systems are already capable of implementing. The MPTCP protocol serves in particular to satisfy the need to ensure continuity for an IP session in the event of the terminal being mobile. The IETF envisages causing the status of present MPTCP specifications to advance so that they become genuine standards in the meaning of the IETF.

The MPTCP protocol has thus been proposed for minimizing any risks of untimely rupture of a TCP connection, e.g. associated with such changes of address, and more generally to satisfy the requirements raised by a context in which a terminal has the ability to connect to one or more networks via one or more interfaces.

Furthermore, in the event of a failure of an attempt to set up an MPTCP connection, Document RFC 6824 makes provision for the connection to switch automatically to a simple TCP connection.

The present invention applies in general manner to any TCP/IP type protocol governing multipath connections. For purely illustrative purposes, there follows a description of the invention applied to the MPTCP protocol, after a few reminders about certain properties of this protocol.

Figure 5:
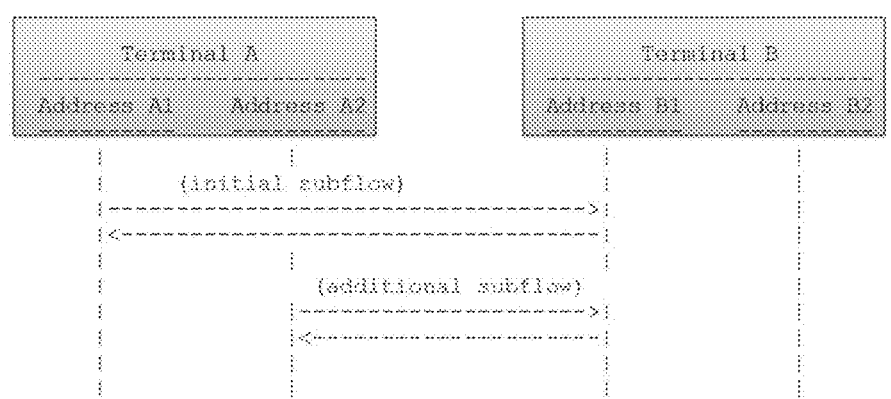
FIG. 5 shows an aggregate of TCP subflows forming a single MPTCP connection.

In the MPTCP protocol, the term "subflow" is used to designate a TCP connection that relies on using one of the available (IP address, port number) pairs. As a result, an MPTCP connection is an aggregate of TCP subflows. By way of example, FIG. 5 shows an MPTCP connection between a terminal A and a terminal B; the initial subflow is set up between the address A1 of the terminal A and the address B1 of the terminal B; subsequently, an additional subflow is set up between the address A2 of the terminal A and the address B1 of the terminal B. An MIF terminal can thus be connected to new networks, or can detach itself from some networks, while maintaining a single multipath connection.

A particularly advantageous example of an application of the MPTCP protocol is transferring voluminous files while using the resources of the file transfer protocol (FTP). A device acting as an FTP client-device can make use dynamically of all of the available paths enabling it to access an FTP server, providing that FTP server is capable of using the various MPTCP connections set up by the FTP client-device. The time required to transfer data is thus significantly shortened compared with a TCP connection.

Various usages may be envisaged for the MPTCP protocol, such as:
exchanging data between a plurality of wireless access networks;
reducing the load on a mobile network by switching a fraction of the traffic to a wireless access network;
optimizing the use of network resources by making simultaneous use of the resources of a plurality of access links and by sharing the traffic load from one or more MPTCP connections over those various links, thus making it possible significantly to increase the bandwidth associated with setting up an MPTCP connection; and
making an MPTCP connection more reliable by switching the traffic switched over a primary path to a backup path in the event of a rupture in the primary path, and to do so in a manner that is transparent for the user (i.e. without interruption of service).

Operating systems make dedicated programming interfaces known as application programming interfaces (APIs) available to applications in order to interact with the TCP and IP layers. The conventional API made available to TCP/IP applications is the "socket" interface. The "socket" interface is characterized by several attributes, such as the "local socket address", the "remote socket address", and the "protocol". Extensions to the TCP/IP API, known as the MPTCP API have been specified by the IETF in Document RFC 6897 to enable applications to control MPTCP connections.

An MPTCP connection is initialized like any conventional TCP connection, except that a TCP option known as MP_CAPABLE (i.e. indicating that the sending terminal is compatible with the MPTCP extensions) is included in the message containing the subflow initialization flag (SYN) and in subsequent messages. An MPTCP terminal can inform the remote terminal about the availability of an additional IP address by using a TCP option known as ADD_ADDR, without necessarily creating an associated subflow.

Indicating a plurality of IP addresses that are available and suitable for use in communication with a third party can lead to failure in setting up certain TCP subflows, because the external IP addresses as perceived by the remote terminals need not be the same as those that are visible locally. That is why the ADD_ADDR option of the MPTCP protocol includes an address identifier referred to as "address ID", that is used to identify without ambiguity an available IP address. This provision is intended to avoid the problems induced by the presence of an NAT on the path followed by the packets between the two terminals that have set up an MPTCP connection. The ADD_ADDR option is also used for transmitting a port number in the event that one of the MPTCP terminals does not use the same port number for all of the available IP addresses.

Likewise, the MPTCP protocol specifies provisions that are intended in particular to make it possible to pass through firewalls. More precisely, the specification of the MPTCP protocol stipulates that the sequence numbers as indicated in the TCP header are specific to each subflow, while the sequence number indicated in the data sequence signal (DSS) option of the MPTCP protocol serves to associate these subflows with the same MPTCP connection.

The MPTCP protocol thus seeks to escape from the constraints imposed by the massive proliferation of so-called "middle boxes" (i.e. intermediate functions in a communications chain), such as NATs and firewalls that are deployed in current networks.

In particular, the MPTCP protocol makes use of the following TCP options:
MP_CAPABLE: this option, mentioned above, is used to inform the remote terminal that the sending terminal is compatible with the MPTCP options;
ADD_ADDR: this option, mentioned above, is used to add a new address; it includes an optional two-octet field for also providing a port number, where appropriate;
REMOVE_ADDR: this option is used for removing an address;
MP_PRIO: this option is used for modifying the priority of a connection;

MP_JOIN: this option is used for identifying the TCP connection that is associated with setting up a new subflow;

MP_FAIL: this option is used to return to TCP mode without MPTCP options; and

MP_FASTCLOSE: this option is used to close an MPTCP connection quickly.

The MPTCP protocol may be activated in several modes:

native mode: two MPTCP terminals set up all of the subflows that correspond to the available address and/or port numbers; and make use of all of the subflows;

primary mode: two MPTCP terminals specify subflows, but only a subset of these subflows is in fact used for transferring data;

secondary mode: in the event of non-availability (or overload) of the "primary" subset of subflows, a "secondary" subset of subflows is then requested in order to provide continuity of the MPTCP connection; and backup mode: two MPTCP terminals use a single subflow; in the event of failure, traffic is switched to a new subflow created for that purpose.

There follows a description of eight implementations of the method of the invention for optimizing the load on a network connection concentrator. In these implementations, it is assumed that the user of an MPTCP-compatible terminal, who is a subscriber to a certain network, seeks to communicate with a content server that is reachable via the network.

The first five implementations are applicable only when the server is likewise MPTCP compatible. The last three implementations are applicable equally well when the server is MPTCP compatible or when it is not.

When the server is MPTCP compatible, the concentrator preferably includes the MP_CAPABLE option when setting up the connection with the server.

It may be useful for the concentrator to be able to verify whether a third party is compatible with multipath connections. To do this, provision may be made for the connection concentrators of the network to use a check list. By way of example, the check list may be built up as follows:

an entity, preferably located in the network, is in charge of carrying out tests for MPTCP support, e.g. on the basis of the list of the most popular sites (in terms of consultation), as represented in the Alexa Top 1000 sites or Top 10,000 sites list;

by way of example, the test procedure may be implemented by a robot simulating MPTCP connections with a predefined server list;

in order to optimize the load on the robot, the network operator may restrict the list of servers to be tested, e.g. so as to include only the most popular servers, or those that generate the most traffic;

the tests may be carried out periodically; the periodicity of the tests is configured by each network service supplier; by way of example, these tests may be daily, weekly, or monthly; and the results of these tests are communicated to the various concentrators deployed in the network, with or without explicit requests from them.

FIG. 6 shows a first implementation of the invention.

In a first step, the terminal sends a SYN message for setting up an MPTCP connection with the server.

In a second step, this connection setup message is intercepted by the concentrator.

In a third step, the concentrator sends to said third party a connection setup SYN message with its source address being identical to one of the addresses IP@c of the concentrator.

In a fourth step, during communication, the concentrator supplies the server with the address IP@t (optionally together with the port number) of the terminal (as stated in the connection setup SYN message received by the concentrator from the terminal), in another session control SYN message sent to the server by means of the ADD_ADDR option. Higher priority may be associated with the address of the terminal.

In a fifth step, the concentrator notifies the server by means of the REMOVE_ADDR option, that it is to end the session relating to the address IP@c used by the concentrator for setting up the initial subflow. Optionally, in order to enable the server to prepare migration of the corresponding traffic to the new address, this notification message specifies a certain due time; if so, the server needs to proceed with migrating states before that due time.

It should be observed that the ADD_ADDR and REMOVE_ADDR options can be sent in any TCP control message, such as an "ACK" message and not only in an "SYN" message. RFC 6824 (as mentioned above) states that there is no need to acknowledge receiving "ACK" messages. Thus, this first implementation can be simplified by making provision to send the ADD_ADDR and REMOVE_ADDR options in ACK messages. Nevertheless, for reliability needs, it is preferable to send these options in SYN messages (which, when well received, are followed by an acknowledgment of receipt) so as to avoid risking disturbing the ongoing connection in the event of non-reception of the message of the fourth step or of the message of the fifth step.

In a sixth step, the server switches the session to the address of the terminal, optionally at the due time specified in the fifth step.

The terminal and the server are then in direct communication, i.e. without passing via the concentrator.

FIG. 7 shows a second implementation of the invention.

In a first step, the terminal sends a SYN message for setting up an MPTCP connection with the server.

In a second step, this connection setup message is intercepted by the concentrator.

In a third step, while setting up the connection or during the communication, the concentrator inserts an option into a session control SYN message sent to the server, which option is referred to as "INTERNAL_SOURCE_ADDRESS" (written "ISA"). This ISA option, shown in FIG. 8, supplies the server with the address IP@t (optionally together with the port number) of the terminal (as specified in the connection setup SYN message received from the terminal by the concentrator). At the same time, this ISA option implicitly notifies the server that it is to switch the session relating to the address IP@c (used by the concentrator in order to set up the initial connection) so as to associate the session with the address IP@t stated in the ISA option, with switching optionally taking place at the due time indicated in the notification message.

During a fourth step, the server sends a SYN/ACK message acknowledging reception directly to the address IP@t of the terminal, as specified in the ISA option, and not to the address IP@c used by the concentrator for setting up the initial connection.

In a fifth step, the server switches to the address of the terminal, optionally at the due time indicated in the third step.

The terminal and the server then communicate directly, i.e. without passing via the concentrator.

FIG. 9 shows a third implementation of the invention.

In a first step, the terminal sends a SYN message for setting up an MPTCP connection with the server.

In a second step, this connection setup message is intercepted by the concentrator.

In a third step, after the connection has been set up or while communication is taking place, the concentrator sends a notification message to the third party, e.g. in the Internet control message protocol (ICMP) format, that provides the server with the address IP@t (optionally together with the port number) of the terminal (as specified in the connection setup SYN message received from the terminal by the concentrator). Simultaneously, the ICMP message implicitly notifies the server that it is to switch the session relating to the address IP@c (as used by the concentrator for setting up the initial connection) so as to associate the session with the address IP@t indicated in the ICMP message, with switching optionally taking place at a due time indicated in the ICMP message.

In order to enable the server to associate the ICMP message with the connection in question, the concentrator inserts a session identifier in the ICMP message. Optionally the concentrator also inserts a nonce for combating attacks of the denial of service type or of the identity usurpation or "spoofing" type.

In a fourth step, the server sends a SYN/ACK message by way of acknowledgment. Two situations are then possible:
  if the ICMP message was sent while setting up the connection (as shown in FIG. 9), the SYN/ACK message is sent to the address IP@t of the terminal, as specified in the ICMP message; or else
  if the ICMP message was sent during communication, the SYN/ACK message is sent to the address IP@c used by the concentrator for setting up the connection; in a variant, in this situation, provision may be made for the server to send no SYN/ACK message, and optionally for the server to send the ICMP message several times over in order to be sure that the server has indeed been notified.

In a fifth step, the server switches to the address of the terminal, optionally at the due time indicated in the third step.

The terminal and the server then communicate directly, i.e. without passing via the concentrator.

In a fourth implementation of the invention, the address of the terminal and an address of the concentrator are acquired by the server by using the resources of a dynamic routing protocol.

By way of example, there follows a description of an application of this implementation to networks that make use of the open shortest path first (OSPF) dynamic routing protocol (as described mainly in IETF Document RFC 2328); these networks are referred to below as "OSPF networks". In this fourth implementation, it is assumed that:
  1) the equipment hosting the concentrator function is connected to or is an OSPF router; and
  2) the server has the capacity to process the characteristic information for implementing the OSPF protocol, such as announcing routes.

It should be recalled that routes of an OSPF network make use of link state advertisement (LSA) packets for exchanging information (e.g. announcing new routes) to all of the routers that form part of the same OSPF area as the router originating the LSA packet, or indeed to all of the routers of the domain (combining a plurality of OSPF areas, where applicable) to which the router originating the advertisement belongs. The term "link state" refers to the nature of the OSPF protocol and to the algorithm on which OSPF relies in order to calculate and select the routes that are installed in the routing tables of the OSPF routers of the network. The algorithm takes account of metrics associated with all of the links that connect the routers of the OSPF network.

There are several types of LSA packets, including opaque LSA packets.

Opaque LSA packets provide a generic mechanism for facilitating functional extensions to the OSPF protocol. The information conveyed in opaque LSA packets may either be used directly by the OSPF protocol, e.g. in order to refine the route calculation process, or else indirectly by an application or a system that seeks to use the resources of an OSPF network in order to distribute particular information to all of the routers making up the OSPF network. In compliance with IETF Document RFC 5250, opaque LSA packets consist in a standard LSA header followed by an information field aligned on 32 bits, of content that is characteristic of the information distributed in the OSPF network; this information is coded using type, length, value (TLV) type coding, and it may be constituted by one or more TLV triplets.

There are three types of opaque LSA: LSA type 9 (or "link-local" type), that are not distributed beyond the local link to which the OSPF router that sends the LSA packet is connected; LSA type 10 (or "area-local" type) that are not distributed beyond the frontiers of the OSPF area to which the OSPF router that sends such a packet belongs; and LSA type 11 (or "autonomous system" (AS) type) that are distributed to all of the OSPF routers making up the autonomous system, whether or not the autonomous system is made up of a plurality of OSFP areas.

The present implementation of the invention relies on using an opaque LSA, called herein "multipath operation" (MP_Operation), which is preferably of type 11 so that the information it conveys can be propagated throughout the domain.

The header of the MP_Operation LSA shown in FIG. 10 complies with the standard header of an LSA packet (defined in Document RFC 2328). The identifier of the MP_Operation LSA is coded on one octet, followed by three octets representing the Instance field; this identifier needs to be allocated by the Internet assigned numbers authority (IRNA) governing structure. The Instance field is an arbitrary value that is used to maintain a plurality of MP_Operation LSAs, up to a theoretical maximum of 16777216 MP_Operation LSAs that can be produced by a single OSPF router. The "age" field gives the time (in seconds) that has elapsed since the MP_Operation LSA was sent (this field is required, and in particular it is defined in the Document RFC 5340).

FIG. 11 shows the steps of this fourth implementation.

In a first step, the terminal sends a SYN message for setting up an MPTCP connection with the server.

In a second step, this connection setup message is intercepted by the concentrator.

In a third step, after the connection has been set up or during communication, the concentrator sends an MP_Operation type LSA to the third party, supplying the server with the address IP@t (optionally together with the port number) of the terminal (as indicated in the connection setup SYN message received from the terminal by the concentrator). Simultaneously, this MP_Operation LSA implicitly notifies the server that it needs to end the session relating to the address IP@c used by the concentrator for setting up the initial connection, optionally at a due time indicated in the MP_Operation LSA.

More precisely, the MP_Operation LSA contains a "top-level TLV" as defined in Document RFC 5250 that gives the nature of the content of the LSA. This top-level TLV is defined as follows: 1—MPTCP endpoint alternate addresses (MEAA).

The MEAA TLV thus describes the set of addresses that represents a terminal connected to a concentrator that is connected to or forms part of the router originating the MP_Operation LSA advertisement. These addresses are described in a succession of sub-TLVs. The sub-TLVs may be encoded as follows:

| Sub-TLV type | Sub-TLV name | Description |
| --- | --- | --- |
| 1 | Concentrator address | Gives an address allocated to a concentrator |
| 2 | Terminal address | Gives an address of the terminal |
| 3 | Timeout | Gives a due time for migrating the sessions to the specified address; "0" indicates that the switchover should take place immediately on receiving the message |

In a fourth step, the server sends a SYN/ACK message acknowledging receipt. Two situations are then possible:
  if the MP_Operation LSA was sent while setting up the connection (situation shown in FIG. 11), the SYN/ACK message is sent to the address IP@t of the terminal, as given in the MP_Operation LSA; or else
  if the MP_Operation LSA was sent during communication, the SYN/ACK message is sent to the address IP@c used by the concentrator for setting up the connection; in a variant, in this situation, provision may be made for the server to send no SYN/ACK message and optionally for the concentrator to send the MP_Operation LSA several times over to be sure that the server has indeed been notified.

In a fifth step, the server switches the session to the address of the terminal, optionally at the due time indicated in the third step.

The terminal and the server then communicate directly, i.e. without passing via the concentrator.

Advantageously, the present implementation provides granularity at terminal level: specifically the content of the opaque LSA may be dictated by a policy of the policy-based routing (PBR) type as defined in Document RFC 1104 and in compliance with various criteria, such as the source address of the terminal, or the marking of the differentiated services (DS) field of the packets sent by the various terminals; this policy determines the behavior of the OSPF router co-located with the concentrator or connected to the concentrator, and where applicable makes it possible to optimize both the resources of the concentrator (e.g. by deciding to send the opaque LSA or not to send it as a function of characteristic information of the terminal), and also the resources of the network (conditional sending of an MP_Operation opaque LSA makes it possible in particular to avoid pointlessly overloading the network).

In a variant, it should be observed that it is possible in the present implementation to use dynamic routing protocols other than the OSPF protocol, e.g. another protocol of the interior gateway protocol (IGP) type such as the intermediate system to intermediate system (IS-IS) routing protocol.

In the following four implementations, the initial concentrator is replaced by a backup concentrator (the person skilled in the art will have no difficulty in adapting these implementations to the situation in which an initial concentrator is replaced by a plurality of backup concentrators). To do this, the same IP address IP@1 is allocated to the internal interfaces of the internal concentrator and of the backup concentrator (the term "internal interface" is used to designate the interface used by the concentrator for receiving traffic coming from the terminal); in order to direct the traffic sent by the terminal to the backup concentrator even though the same IP address has been allocated to the initial concentrator, the routing is modified, e.g. by modifying the interior gateway protocol (IGP) preferences, or by withdrawing the advertisement of the route enabling the initial concentrator to be reached, or indeed by implementing an explicit redirection policy using a mechanism of the "policy-based routing" type, for example.

These four implementations have the following steps in common.

1) Depending on information configured by the operator or on the basis of observed events (e.g. a traffic threshold being exceeded, or a CPU use percentage), the initial concentrator detects that some or all of the connections need to be switched to one or more backup concentrators.

2) The initial concentrator identifies the connections that are to be transferred to the backup concentrator(s). This identification may be performed on the basis of instructions configured on the initial concentrator (e.g. on certain servers with which a connection is set up and identified by their addresses, or on certain client terminals and/or devices that have set up a connection and that are identified by at least one of their respective addresses).

3) A list of backup concentrators is configured beforehand in the initial concentrator, together with security keys for use in securing the transfer of streams so as to minimize any risk of traffic and/or connections being intercepted. In a variant, this list of backup concentrators may also be acquired dynamically by the initial concentrator so as to facilitate configuration operations associated with operating the initial concentrator and the backup concentrators. Such dynamics can also be used to optimize installing loading policies for the various concentrators on the basis of various considerations: for example day-time operation and night-time operation of the initial concentrator and of the backup concentrators may be indexed on traffic profiles that have an influence on the way in which load may be shared between the concentrators depending on the time period of operation. As a function of information about the loading of the backup concentrators as acquired dynamically by the initial concentrator, the initial concentrator may request that one or more MPTCP connections be set up with one or more of these backup concentrators.

4) At the initiative of the initial concentrator, one or more TCP connections are set up with at least one backup concentrator in order to exchange the connection contexts (mainly the addresses of the remote terminals in question, port numbers, etc.). To do this, it is convenient to make use of a TCP option that can be referred to as "SESSION_DESCRIPTION".

Figure 12:
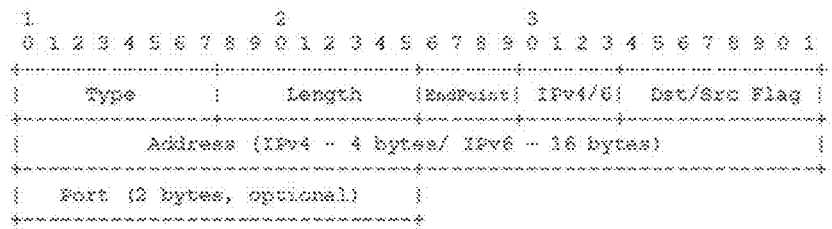
FIG. 12 shows a first format example for the session description messages sent by an initial concentrator to a backup concentrator.

In a first variant, shown in FIG. 12, the SESSION_DESCRIPTION option is structured in the form of a "container" describing the current session (where a "container" is a structure for grouping together characteristic and descriptive information about a current session, which avoids any need to manipulate an entire set of distinct options, each being descriptive of only one item of information that is characteristic of a current session). The SESSION_DESCRIPTION option gives at least the address of the terminal and the address of the server. These addresses may be coded using an "EndPoint" option. It is specified whether it is an IPv4 address or an IPv6 address. The "Dst/Src flag" attribute specifies whether the option is conveying the destination address or the source address.

Figure 13:
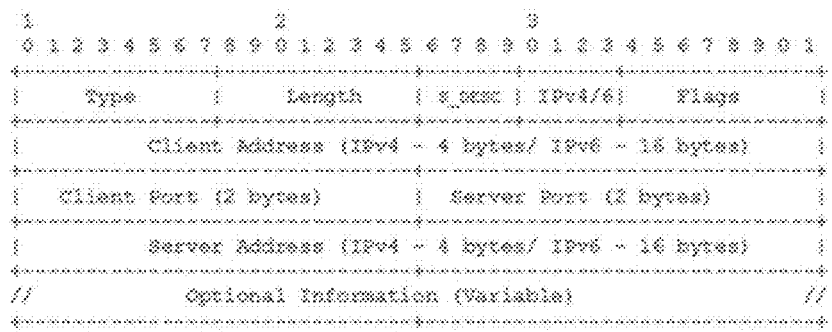
FIG. 13 shows a second format example for the session description messages sent by an initial concentrator to a backup concentrator.

In a second variant, shown in FIG. 13, the SESSION_DESCRIPTION option is structured in the form of a dedicated option. The SESSION_DESCRIPTION option gives the address of the terminal and the address of the server. The "Flags" attribute is used for potential future uses, such as indicating the type of optional information elements included in the option. The SESSION_DESCRIPTION option may in particular include the external address and the port number that are used by the concentrator for the connection. This address and this port number need to be used throughout the connection, otherwise the server will reject the packet. A security hash may be included in this option.

5) Optionally, the initial concentrator indicates a due time for each context or for all of the contexts to be transferred when switching to the backup concentrator so as to facilitate maintenance operations and, where appropriate, so as to minimize any risk of service interruption (in the event of a problem in accessing the backup concentrators, for example).

6) The initial concentrator notifies the server (corresponding to the third party with which the client-device is communicating) about the availability of a new address. This new address is one of the addresses of the backup concentrator selected for the present connection (and not, as in the first four implementations, an address of the terminal). One or more subflows are then added to the MPTCP connection.

7) The initial concentrator notifies (explicitly or implicitly) the third party that it is to end the session relating to the address of the initial concentrator, optionally at said due time, after which the terminal, the backup concentrator, and the server exchange data directly.

Figure 14:
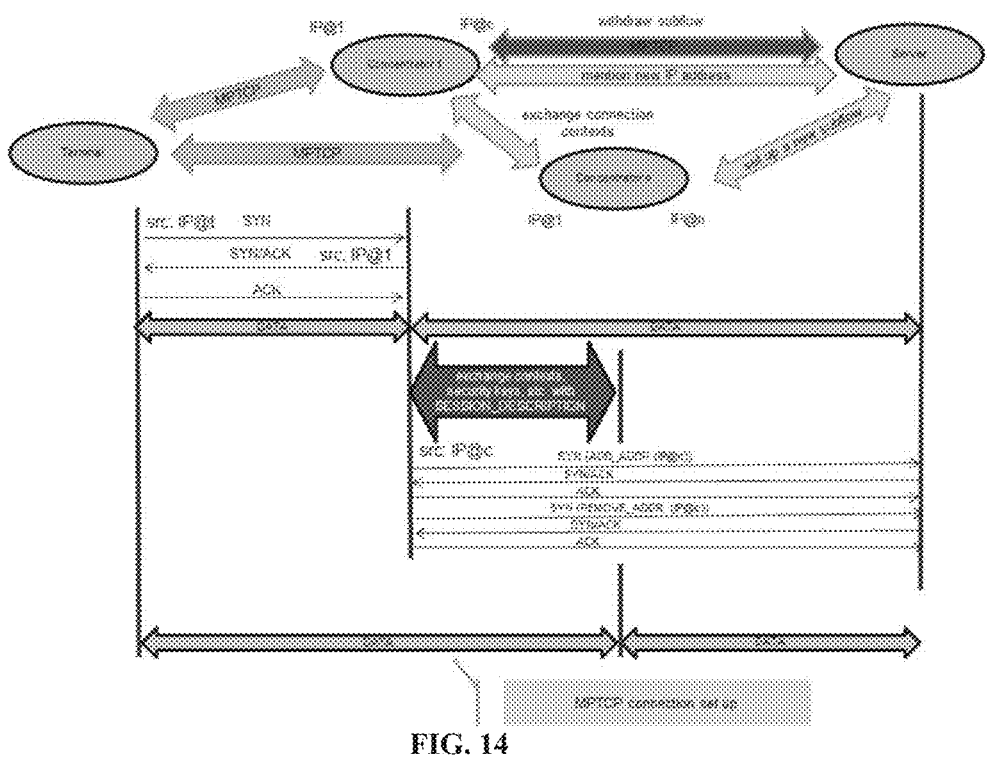
FIG. 14 shows a fifth implementation of the invention.

FIG. 14 shows a fifth implementation of the invention.

This fifth implementation is analogous to the first implementation described above with reference to FIG. 6.

Figure 15:
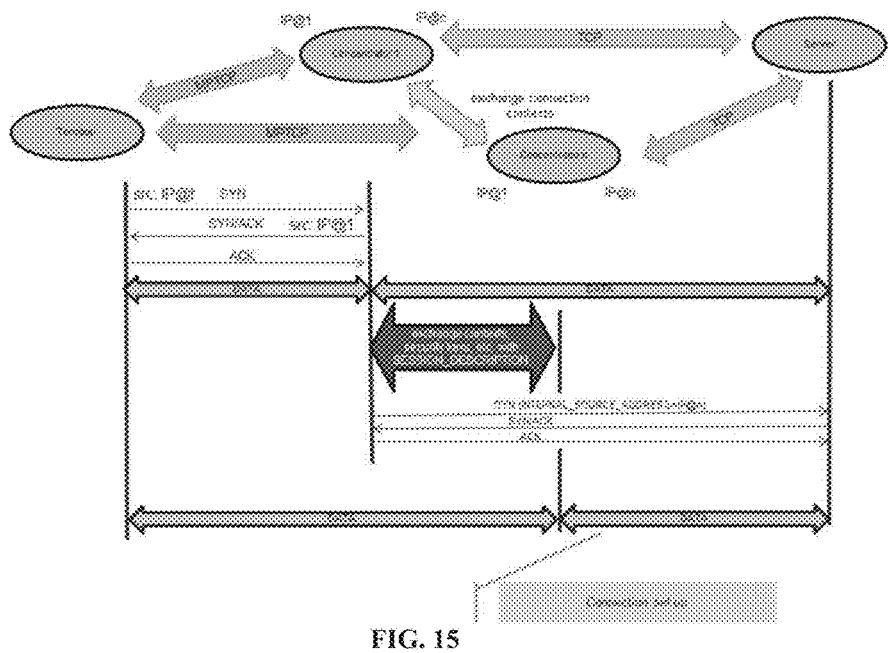
FIG. 15 shows a sixth implementation of the invention.

FIG. 15 shows a sixth implementation of the invention.

This sixth implementation is analogous to the second implementation described above with reference to FIG. 7.

Figure 16:
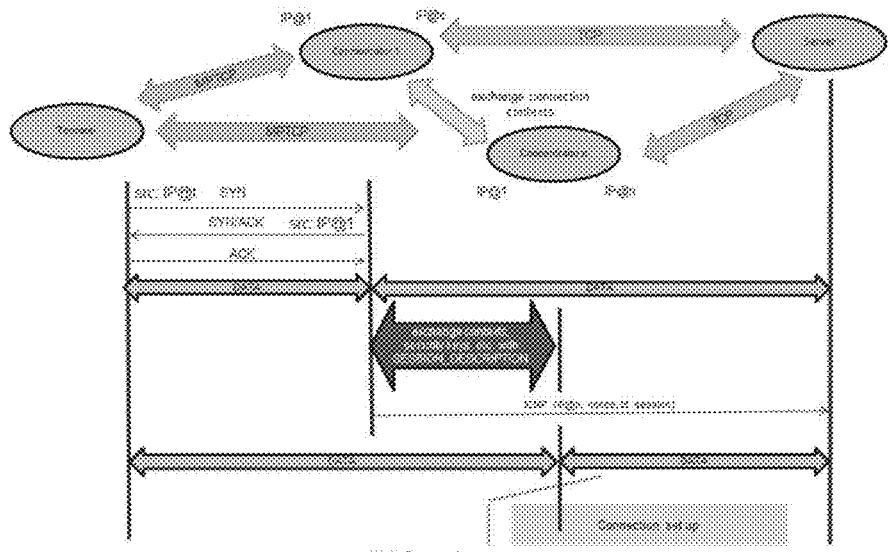
FIG. 16 shows a seventh implementation of the invention.

FIG. 16 shows a seventh implementation of the invention.

This seventh implementation is analogous to the third implementation described above with reference to FIG. 9.

Figure 17:
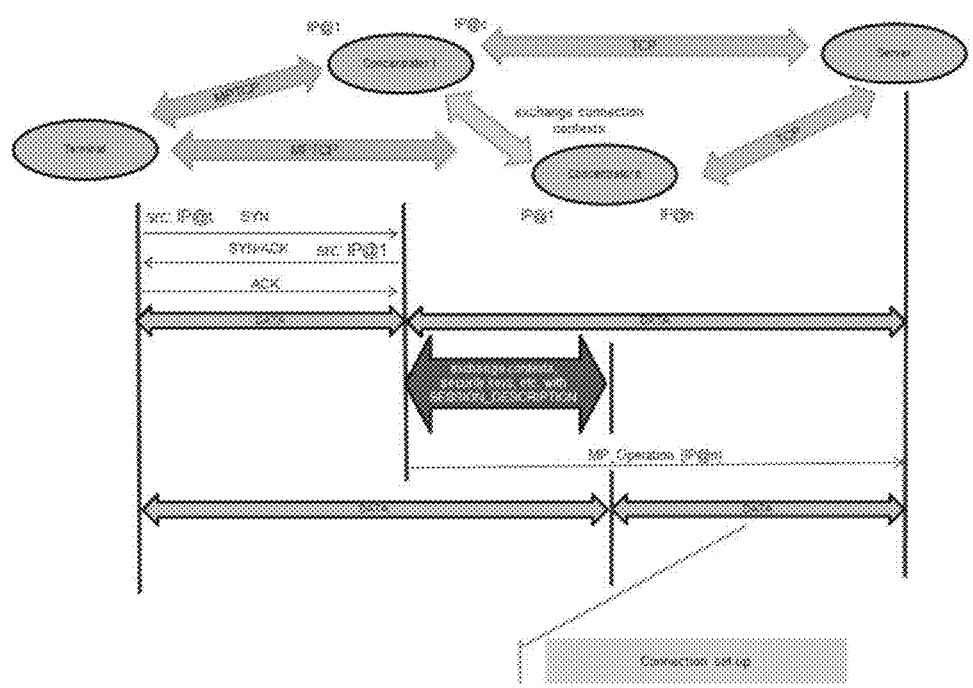
FIG. 17 shows an eighth implementation of the invention.

FIG. 17 shows an eighth implementation of the invention.

This eighth implementation is analogous to the fourth implementation described above with reference to FIG. 11.

The invention can be performed within nodes of communications networks, e.g. network connection concentrators, by using software and/or hardware components. The concentrator function may be hosted in a datacenter or it may be located in a piece of equipment in the transport network. The function of the concentrator may also be a virtual instance.

Said software components may be incorporated in a conventional computer program for managing a network node. That is why, as mentioned above, the present invention also provides a computer system. The computer system comprises in conventional manner a central processor unit using signals to control a memory, together with an input unit and an output unit. Furthermore, the computer system may be used to execute a computer program including instructions for implementing any of the methods of the invention for optimizing the load of a network connection concentrator.

Specifically, the invention also provides a computer program as described briefly above. The computer program may be stored on a computer readable medium and may be suitable for execution by a microprocessor. The program may use any programming language, and may be in the form of source code, object code, or code intermediate between source code and object code, such as in a partially compiled form, or in any other desirable form.

The invention also provides a non-removable or partially or completely removable data medium including instructions of a computer program as described briefly above.

The data medium may be any entity or device capable of storing the program. For example, the data medium may comprise storage means such as a read only memory (ROM), e.g. a compact disk (CD) ROM or a microelectronic circuit ROM, or magnetic recording means such as a hard disk, or indeed a universal serial bus (USB) flash drive.

Furthermore, the data medium may be a transmissible medium such as an electrical or optical signal, suitable for being conveyed via an electrical or optical cable, by radio, or by other means. The computer program of the invention may in particular be downloaded from a network such as the Internet.

In a variant, the data medium may be an integrated circuit in which the program is incorporated, the circuit being adapted to execute or to be used in the execution of any of the optimization methods of the invention.

Although the present disclosure has been described with reference to one or more examples, workers skilled in the art will recognize that changes may be made in form and detail without departing from the scope of the disclosure and/or the appended claims.

The invention claimed is:

1. An optimization method for optimizing load of a network connection concentrator in which data packets transmitted or received by a client-device compatible with a given multipath connection protocol are intercepted by a concentrator that is reachable from at least one network to which said client-device is connected, said concentrator serving to aggregate connections making use of a plurality of paths that may be used by the client-device, said method comprising the following acts:
   a) said concentrator intercepting a connection setup message sent by a client device for setting up a connection with a third party;
   b) the concentrator sending a connection setup message to said third party in which a source address, referred to as a "first" address, is identical to at least one address of the concentrator;
   c) the concentrator sending information to the third party including another address, referred to as a "second" address; and
   d) the concentrator notifying the third party that the third party is to switch the session associated with said first address so as to associate the session with said second address.

2. The optimization method according to claim 1, wherein said second address is identical to at least one address of said client-device, or to at least one address of a backup concentrator.

3. The optimization method according to claim 1, wherein said third party is likewise compatible with said multipath protocol, and:

in said step c), said concentrator mentions said second address in a first option inserted in a session control message; and in said step d), the concentrator mentions said first address in a second option inserted in a session control message.

4. The optimization method according to claim 1, wherein, in said steps c) and d), said concentrator inserts an option in a session control message sent to said third party, which option provides the third party with said second address and implicitly notifies the third party that the third party is to switch the session associated with said first address so as to associate the session with said second address.

5. The optimization method according to claim 1, wherein in said steps c) and d), said concentrator sends a notification message to said third party providing the third party with said second address and notifying the third party implicitly that the third party is to switch the session associated with said first address so as to associate the session with said second address.

6. The optimization method according to claim 1, wherein:

said third party has the capacity to process characteristic information for implementing an open shortest path first protocol; and equipment hosting the concentrator is connected to or is itself an OSPF router;

and wherein in said steps c) and d), said concentrator sends a packet of opaque link state advertisement type to said third party, providing the third party with said second address and notifying the third party implicitly that the third party is to switch the session associated with said first address so as to associate the session with said second address.

7. The optimization method according to claim 1, wherein in said step d) said concentrator notifies said third party of a due time for said switching of the session.

8. A network connection concentrator reachable from at least one network to which a client-device compatible with a given multipath connection protocol is connected, the concentrator comprising:

a processor; and a non-transitory computer-readable medium comprising instructions stored thereon, which when executed by the processor configure the network connection concentrator to perform acts comprising:

intercepting data packets sent or received by said client-device and aggregating connections making use of a plurality of paths that can be used by the client-device;

intercepting a message sent by said client-device for setting up a connection with a third party;

sending a connection setup message to said third party in which a source address, referred to as a "first" address, is identical to at least one address of the concentrator;

sending information to the third party including another address, referred to as a "second" address; and notifying the third party that the third part is to switch the session associated with said first address so as to associate the session with said second address.

9. The network connection concentrator according to claim 8, wherein said second address is identical to at least one address of said client-device, or to at least one address of a backup concentrator.

10. The network connection concentrator according to claim 8, wherein said third party is likewise compatible with said multipath protocol, and said instructions further configure the network connection concentrator to:

mention said second address in a first option inserted in a session control message; and mention said first address in a second option inserted in a session control message.

11. The network connection concentrator according to claim 8, wherein the instructions further configure the network connection concentrator to insert an option in a session control message sent to said third party, which option provides the third party with said second address and implicitly notifies the third party to switch the session associated with said first address so as to associate the session with said second address.

12. The network connection concentrator according to claim 8, wherein the instructions further configure the network connection concentrator to send a notification message to said third party providing the third party with said second address and notifying the third party implicitly to switch the session associated with said first address so as to associate the session with said second address.

13. The network connection concentrator according to claim 8, wherein, while said third party has capacity to process characteristic information for implementing an open shortest path first protocol, equipment hosting the network connection concentrator is connected to or is itself an OSPF router, and wherein the instructions further configure the network connection concentrator to send a packet of opaque link state advertisement type to said third party, providing the third party with said second address and notifying the third party implicitly to switch the session associated with said first address so as to associate the session with said second address.

14. The network connection concentrator according to claim 8, wherein the instructions further configure the network connection concentrator to notify said third party of a due time for said switching of the session.

15. A non-transitory computer-readable medium comprising a computer program or stored thereon and executable by a processor, wherein the program includes instructions for executing an optimization method when the instructions are executed by the processor, wherein the optimization method comprises:

optimizing load of a network connection concentrator in which data packets transmitted or received by a client-device compatible with a given multipath connection protocol are intercepted by a concentrator that is reachable from at least one network to which said client-device is connected, said concentrator serving to aggregate connections making use of a plurality of paths that may be used by the client-device, said method comprising the following acts:

a) the concentrator intercepting a message for setting up a connection with a third party sent by a client device;

b) the concentrator sending a connection setup message to said third party in which a source address, referred to as a "first" address, is identical to at least one address of the concentrator;

c) the concentrator sending information to the third party including another address, referred to as a "second" address; and e) the concentrator notifying the third party that the third party is to switch the session associated with said first address so as to associate the session with said second address.

* * * * *